US006279927B1

(12) United States Patent
Nishihira et al.

(10) Patent No.: US 6,279,927 B1
(45) Date of Patent: Aug. 28, 2001

(54) WHEELCHAIR

(75) Inventors: Tetsuya Nishihira, Tokyo; Masayoshi Suzuki, Kasukabe; Morikazu Nishihira, Fuchu, all of (JP)

(73) Assignees: Misawahomu Kabushiki Kaisha; Kabushiki Kaisha Yunikamu, both of Tokyo (JP)

( * ) Notice: Subject to any disclaimer, the term of this patent is extended or adjusted under 35 U.S.C. 154(b) by 0 days.

(21) Appl. No.: 09/230,593

(22) PCT Filed: Jun. 2, 1998

(86) PCT No.: PCT/JP98/02424

§ 371 Date: Feb. 2, 1999

§ 102(e) Date: Feb. 2, 1999

(87) PCT Pub. No.: WO98/55066

PCT Pub. Date: Dec. 10, 1998

(30) Foreign Application Priority Data

Jun. 6, 1997 (JP) ..................................................... 9-165050

(51) Int. Cl.[7] ..................................................... B62B 39/00

(52) U.S. Cl. ................................ 280/43; 180/209; 180/11

(58) Field of Search ................................ 280/250.1, 211, 280/214, 43; 180/907, 209, 6.5, 11, 12, 23, 24, 65.1, 65.6

(56) References Cited

U.S. PATENT DOCUMENTS

| | | | | |
|---|---|---|---|---|
| 4,128,137 | * | 12/1978 | Booth | 180/6.5 |
| 4,310,167 | * | 1/1982 | McLaurin | 280/5.28 |
| 5,423,563 | * | 6/1995 | Wild | 280/250.1 |
| 5,575,348 | * | 11/1996 | Goertzen et al. | 180/65.6 |
| 5,848,658 | * | 12/1998 | Pulver | 180/65.1 |
| 5,964,473 | * | 10/1999 | Degonda et al. | 280/250.1 |
| 6,041,876 | * | 3/2000 | Pulver et al. | 180/65.1 |
| 6,070,898 | * | 6/2000 | Dickie et al. | 280/304.1 |

FOREIGN PATENT DOCUMENTS

| | | |
|---|---|---|
| JP 58 063575 | 4/1983 | (JP) . |
| 290857 | 11/1996 | (TW) . |

* cited by examiner

*Primary Examiner*—J. J. Swann
*Assistant Examiner*—J. Allen Shriver, II
(74) *Attorney, Agent, or Firm*—Armstrong, Westerman, Hattori, McLeland & Naughton, LLP

(57) ABSTRACT

In a wheelchair which comprises a pair of drive wheels mounted to a body frame and a front caster wheel and a rear caster wheel mounted to the body frame to the front and rear of the drive wheels so as to allow the wheelchair to turn at a stationary position, a link member extends between the body frame and the drive wheels, and includes one end pivotally connected to an upper part of the body frame and another end rotatably supporting the drive wheel, a rotary shaft of the drive wheels being placed behind a point of connection between the body frame and the link member at least before the front caster wheel abuts a stepped portion of a floor surface. Thus, when the front caster wheel runs into a stepped portion of a floor surface as the wheelchair moves forward, the link member turns around the point of connection between the body frame and the link member so as to reduce the distance between the front caster wheel and the drive wheels while, at the same time, the front end of the body frame tilts upward around the rear caster wheel. The front caster wheel thereby lands on the upper surface of the step, and successfully rides over the step.

4 Claims, 17 Drawing Sheets

WHEELCHAIR

TECHNICAL FIELD

The present invention relates to a wheelchair comprising a body frame equipped with a pair of drive wheels, and caster wheels arranged to the front and rear of the drive wheels so as to allow the wheelchair to be turned while remaining at a stationary point, and in particular to such a wheelchair which can travel over stepped floor surfaces without causing discomfort to the user while allowing the diameter of the drive wheels to be minimized for maximum maneuverability.

BACKGROUND OF THE INVENTION

As the proportion of senior citizens in the entire population increases at a rapid rate in recent years, an increasingly large number of newly built houses are based on barrier-free design. According to the concept of barrier-free design, no step-like discontinuity exists between adjacent living spaces, and a home elevator is often installed so as to allow the occupant to move from one floor level to another without descending or ascending stairways.

Senior citizens may be mostly capable of walking short distances but are often unable to walk to remote destinations.

Under such circumstances, there have been a significant amount of demand for motor-powered wheelchairs for home use which are suitable for lightly disabled people such as senior citizens. More conventional and widely used motor-powered wheelchairs are designed for more highly disabled people, and are normally large in size and not very maneuverable.

Based on such a consideration, KK Unicam or one of the co-applicants of this application previously developed a wheelchair for home use which comprises a body frame equipped with a pair of drive wheels, and caster wheels arranged to the front and rear of the drive wheels so as to allow the wheelchair to be turned while remaining at a stationary point, and announced it in the Journal of the Japan Society of Orthotics & Prosthetics, Vol. 9, No. 2 (1993).

This wheelchair for home use is capable of turning at a stationary position and compact in size so that it can be turned in a tight space such as an elevator cage without being interfered by the walls of the elevator cage. Also, the diameter of the drive wheels is significantly reduced for a high maneuverability.

However, as this wheelchair for home use developed by KK Unicam or one of the co-applicants of this application is adapted to ride over a step by lifting the front caster wheels by making use of the rearward inertia force resulting from a sudden forward movement of the wheelchair, the following problems were found as the wheelchair rides over a stepped part of the floor.

(1) the user experiences some discomfort from the sudden acceleration of the wheelchair;

(2) the wheelchair must often come to a sudden stop after riding over a stepped part of the floor to avoid collision with wall surfaces, in particular in narrow passages: and (3) a special mode of operation is required when riding over a stepped part of the floor which may not be easy to execute for a senior individual.

The present invention was made in view of such problems, and has its primary object to provide a wheelchair which can travel over stepped floor surfaces without causing discomfort to the user while allowing the diameter of the drive wheels to be minimized for maximum maneuverability.

BRIEF SUMMARY OF THE INVENTION

According to a first aspect of the present invention, there is provided a wheelchair comprising a pair of drive wheels mounted to a body frame and a front caster wheel and a rear caster wheel mounted to the body frame to the front and rear of the drive wheels so as to allow the wheelchair to turn at a stationary position, further comprising: a link member extending between the body frame and the drive wheels, and having one end pivotally connected to an upper part of the body frame and another end rotatably supporting the drive wheels; a rotary shaft of the drive wheels being placed behind a point of connection between the body frame and the link member at least before the front caster wheel abuts a stepped portion of a floor surface.

Thus, when the front caster wheel runs into a stepped portion of a floor surface as the wheelchair moves forward, the link member turns around the point of connection between the body frame and the link member so as to reduce the distance between the front caster wheel and the drive wheels while, at the same time, the front end of the body frame tilts upward around the rear caster wheel. The front caster wheel thereby lands on the upper surface of the step, and successfully rides over the step.

According to the first aspect of the present invention, the improved wheelchair may further comprise first spring means and second spring means disposed between the link member and the body frame, the first spring means applying a downward urging force to the link member, and the second spring means applying an upward urging force to the link member; the second spring means comprising a first bracket attached to the body frame so as to be moveable in a fore-and-aft direction, a second bracket attached to the link member, and a tension spring engaged between the two brackets, the tension spring having a stronger spring force than the first spring means, and normally maintaining the first bracket and the second bracket in a mutually abutting relationship; a length of the second spring means when the first second bracket and the second bracket are placed in a mutually abutting relationship being selected so as to coincide with a length thereof when the second bracket is located at a frontmost position with respect to the body frame, and the second spring means prevents the downward movement of the link member against the spring force of the first spring means with the drive wheels kept in contact with the floor surface.

Thus, the drive wheels can be firmly pressed onto the floor surface while, at the same time, avoiding the front casters from being excessively lifted from the floor surface.

According to a second aspect of the present invention, there is provided a wheelchair comprising a pair of drive wheels mounted to a body frame and a front caster wheel and a rear caster wheel mounted to the body frame to the front and rear of the drive wheels so as to allow the wheelchair to turn at a stationary position, further comprising: a first link member and a second link member extending between the body frame and the drive wheels, and having one end pivotally connected to an upper part of the body frame and another end rotatably supporting the drive wheels; a rotary shaft of the drive wheels being placed behind a point of connection between the body frame and the first link member at least before the front caster wheel abuts a stepped portion of a floor surface, and ahead of a point of connection between the body frame and the second link member at least before the rear caster wheel abuts a stepped portion of a floor surface; the first and second link members being switch over in such a manner that the first link member is selected when the wheelchair rides over a stepped portion of a floor surface as it moves forward, and the second link member is selected when the wheelchair rides over a stepped portion of a floor surface as it moves rearward.

Thus, the wheelchair is provided with the following features.

(1) When the front caster wheel runs into a stepped portion of a floor surface as the wheelchair moves forward, the first link member turns around the point of connection between the body frame and the first link member so as to reduce the distance between the front caster wheel and the drive wheels while, at the same time, the front end of the body frame tilts upward around the rear caster wheel. The front caster wheel thereby lands on the upper surface of the step, and successfully rides over the step.

(2) When the rear caster wheel runs into a stepped portion of a floor surface as the wheelchair moves backward, the second link member turns around the point of connection between the body frame and the second link member so as to reduce the distance between the rear caster wheel and the drive wheels while, at the same time, the rear end of the body frame tilts upward around the front caster wheel. The rear caster wheel thereby lands on the upper surface of the step, and successfully rides over the step.

According to the second aspect of the present invention, the improved wheelchair may be such that the first link member is pivotally attached to an upper part of the body frame at one end thereof, and the second link member is pivotally attached to another end of the first link member at one end thereof at an upper part of the body frame; the wheelchair further comprising: a first stopper for fixing the first link member relative to the body frame, and rotatably supporting the drive wheels at another end of the second link member when the wheelchair rides over a stepped portion of a floor surface as the wheelchair moves rearward; and a second stopper for fixing the first and second link members relative to each other, and rotatably supporting the drive wheels at another end of the first link member when the wheelchair rides over a stepped portion of a floor surface as the wheelchair moves forward.

Thus, as soon as the front caster wheel abuts a stepped portion of a floor surface as the wheelchair moves forward, because the second stopper performs its function, the first link member is selected, and the stepped portion may be ridden over as the wheelchair moves forward. Conversely, as soon as the rear caster wheel abuts a stepped portion of a floor surface as the wheelchair moves rearward, because the first stopper performs its function, the second link member is selected, and the stepped portion may be ridden over as the wheelchair moves rearward.

BRIEF DESCRIPTION OF THE DRAWINGS

Now the present invention is described in the following with reference to the appended drawings, in which.

DETAILED DESCRIPTION OF THE PREFERRED EMBODIMENTS

Now the present invention is described in the following with reference to the appended drawings.

Figure 1:
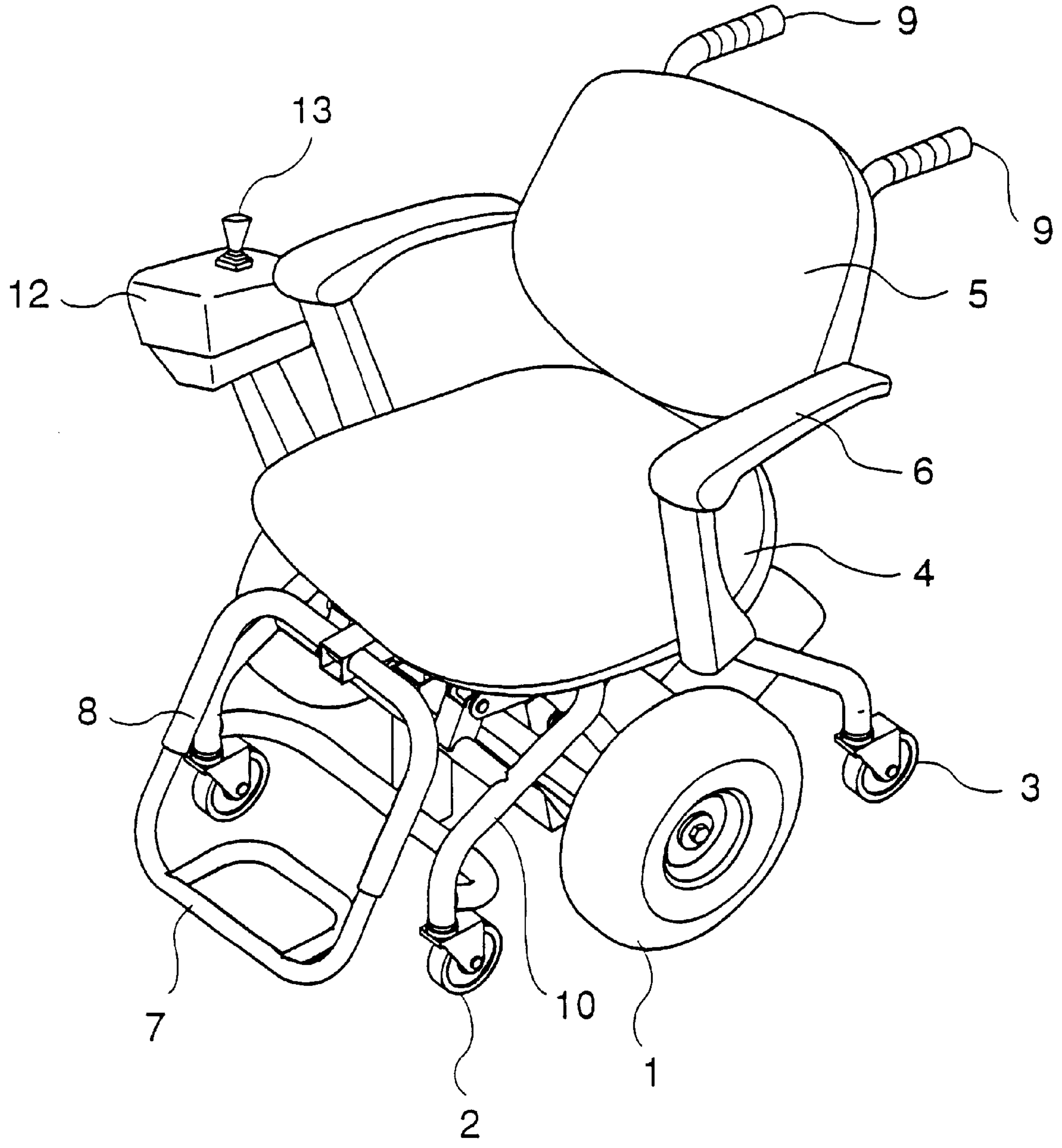
FIG. 1 is a perspective view of the external appearance of an electric motor-powered wheelchair embodying the present invention.
Figure 2:
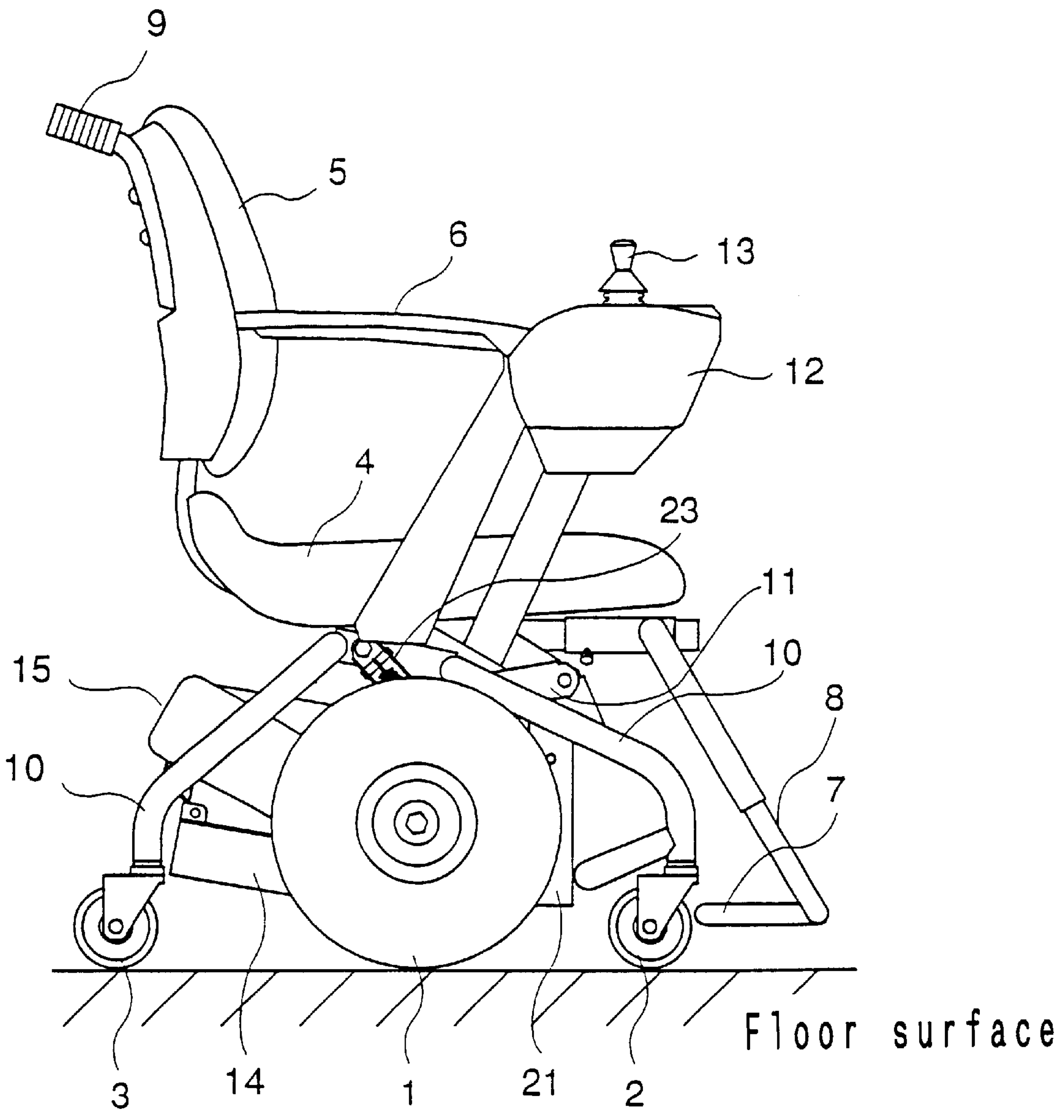
FIG. 2 is a side view of the wheelchair of FIG. 1.
Figure 3:
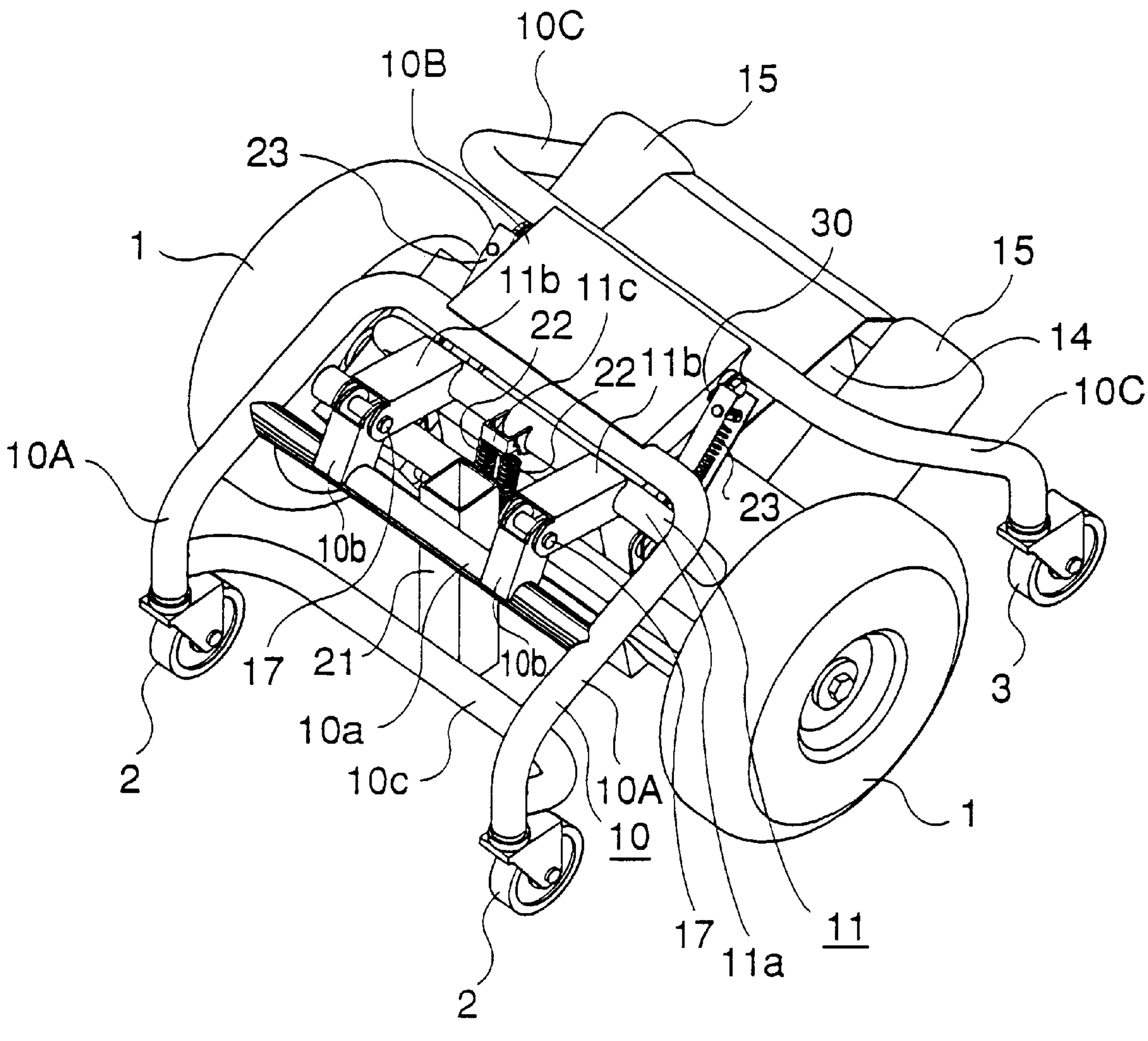
FIG. 3 is a perspective view of the external appearance of the undercarriage forming an essential part of the electric motor-powered wheelchair of FIG. 1.
Figure 4:
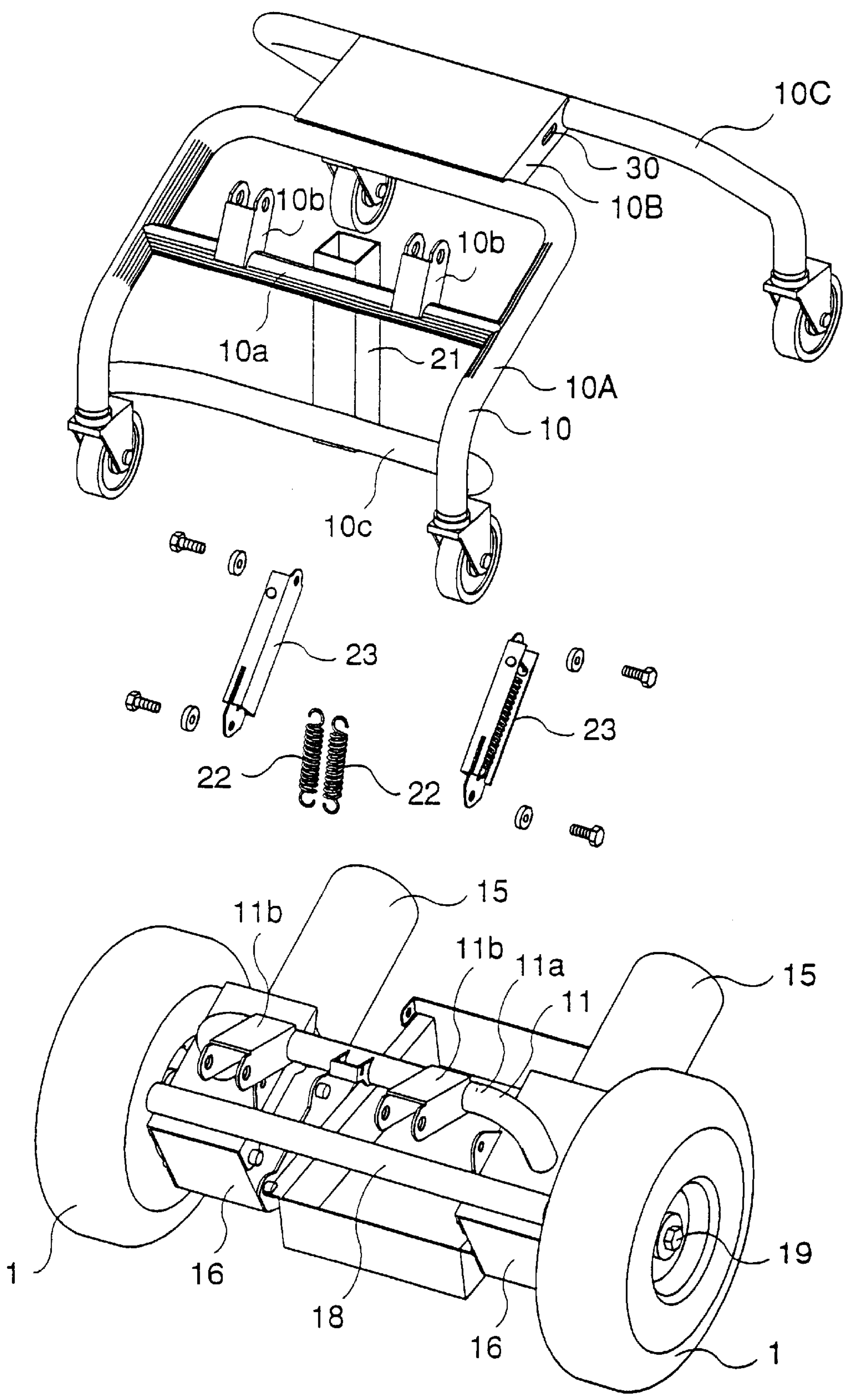
FIG. 4 is a partly omitted, exploded perspective view of the undercarriage forming an essential part of the electric motor-powered wheelchair of FIG. 1.
Figure 5:
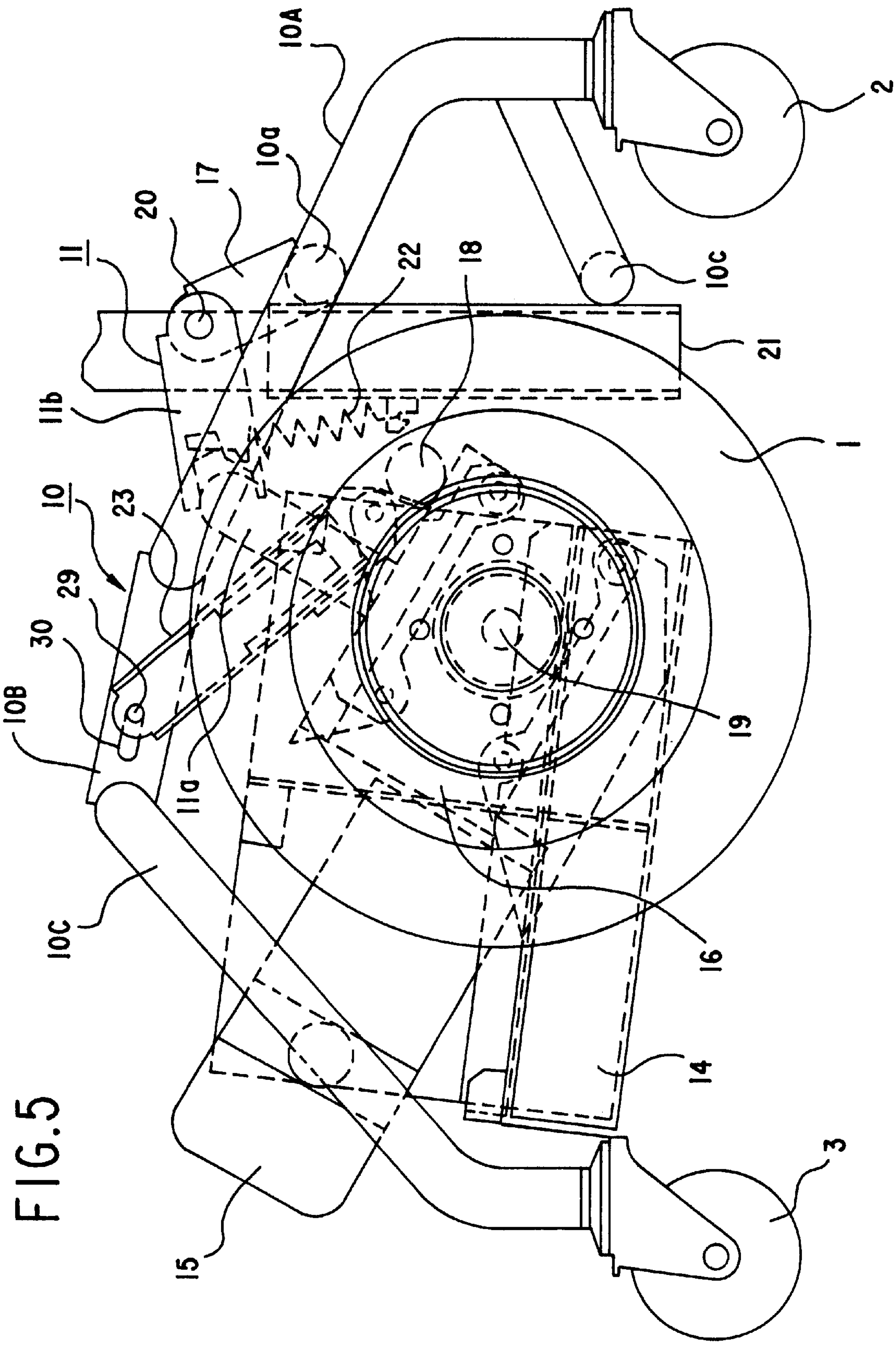
FIG. 5 is a side view of the undercarriage forming an essential part of the electric motor-powered wheelchair of FIG. 1.
Figure 6:
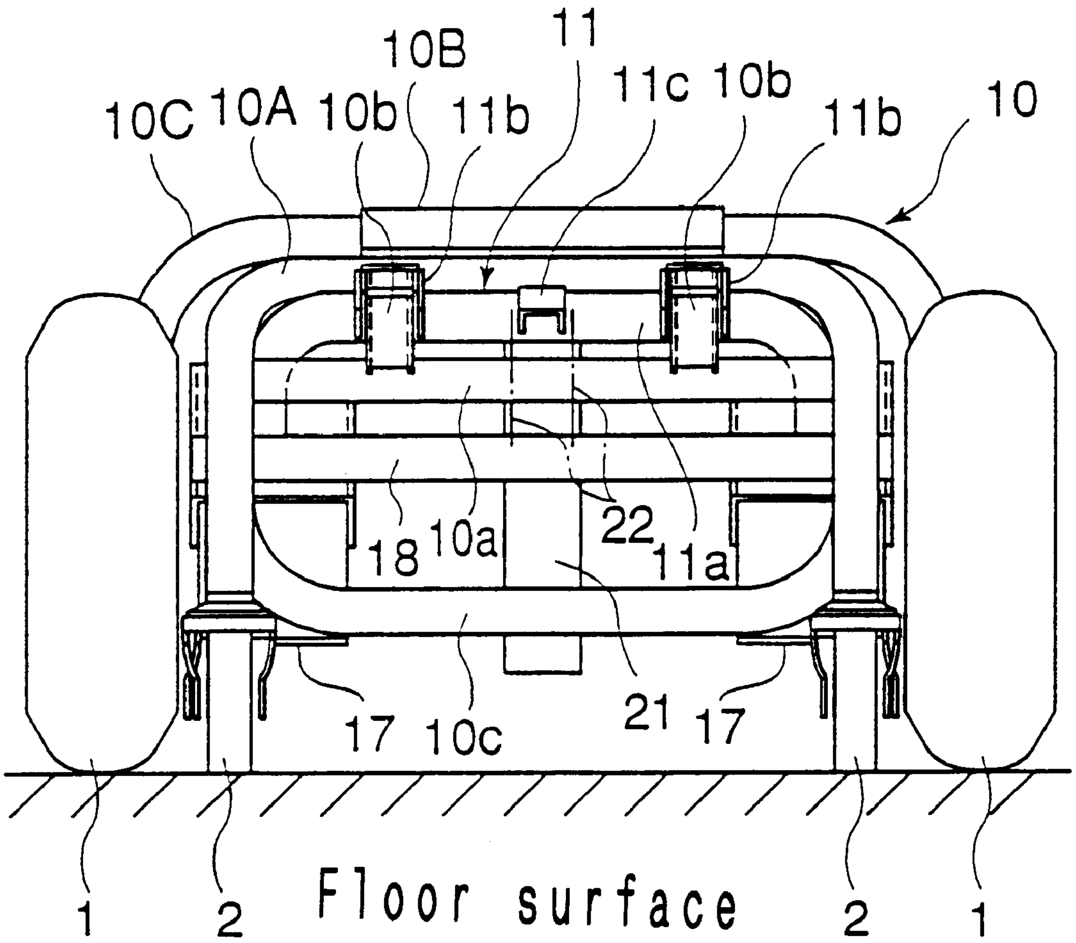
FIG. 6 is a front view of the undercarriage forming an essential part of the electric motor-powered wheelchair of FIG. 1.

FIG. 1 is a perspective view of the external appearance of an electric motor-powered wheelchair embodying the present invention, FIG. 2 is a side view of the wheelchair of FIG. 1, FIG. 3 is a perspective view of the external appearance of an undercarriage forming an essential part of the electric motor-powered wheelchair of FIG. 1, FIG. 4 is a partly omitted, exploded perspective view of the undercarriage forming an essential part of the electric motor-powered wheelchair of FIG. 1; FIG. 5 is a side view of the undercarriage forming an essential part of the electric motor-powered wheelchair of FIG. 1; and FIG. 6 is a front view of the undercarriage forming an essential part of the electric motor-powered wheelchair of FIG. 1. In these drawings, numeral 1 denotes drive wheels, numeral 2 denotes front caster wheels, numeral 3 denotes rear caster wheels, numeral 4 denotes a seat, numeral 5 denotes a seat back, numeral 6 denotes armrests, numeral 7 denotes a foot rest, numeral 8 denotes a foot rest support, numeral 9 denotes push handles, numeral 10 denotes a body frame, numeral 11 denotes a link member, numeral 12 denotes a console unit, numeral 13 denotes a joystick, numeral 14 denotes a battery, numeral 15 denotes an electric motor, numeral 16 denotes a reduction gear unit, numeral 17 denotes pins, numeral 18 denote a pipe member, numeral 19 denotes an output shaft, numeral 20 denotes a coupling, numeral 21 denotes a seat mount pipe, numeral 22 denotes a tension spring, and numeral 23 denotes spring means.

In this electric motor-powered wheelchair, a pair of drive wheels 1 are mounted to the body frame 10 via the link members 11, and the pair of front caster wheels 2 and the pair of rear caster wheels 3 are mounted to the front and rear parts of the body frame 10, respectively, relative to the drive wheels 1. Thus, an undercarriage is formed which can turn the wheelchair around an approximately middle point of the line connecting the rotational centers of the drive wheels 1 while keeping the wheelchair stationary.

The body frame 10 and the link member 11 are described in the following with reference to FIGS. 3 to 6. The body frame 10 comprises a front frame 10A, a middle frame 10B and a rear frame 10C. The front frame 10A and the rear frame 10C are formed by bending pipe members, and each end of the pipe members is fitted with the front caster wheel 2 or the rear caster wheel 3 as the case may be. The middle frame 10B is formed into a box by welding plate members together, and the front frame 10A and the rear frame 10C are integrally welded to this middle frame 10B.

The front frame 10A comprises a horizontally extending support pipe 10*a*, and a pair of brackets 10*b* are attached to either end portion of the support pipe 10*a* and pivotally support the link member 11.

The link member 11 comprises a pipe member 11*a* including a horizontally disposed middle part and a pair of brackets 11*b* attached to the horizontal middle part. The brackets 11*b* of this link member 11 and the brackets 10*b* of the front frame members 10A are respectively joined by pins 17 in such a manner that the link member 11 is attached to the body frame 10 so as to be pivotable around the pins 17 (connecting point P). In other words, the link member 11 joins the body frame 10 and the drive wheels 1 by being pivotally attached to an upper part of the body frame 10 at one end thereof and rotatably supporting the drive wheels 1 at the other end thereof. The output shaft 19 which serves as the axle shaft of the drive wheels 1 is located behind the connecting point P between the body frame 10 and the link member 11 at least before the front caster wheels 11 run into a stepped portion of the floor surface.

Each outer end of the pipe member 11*a* is fixedly attached to a housing of the corresponding one of the gear reduction units 16, and the two gear reduction units 16 are connected to each other by the pipe member 18. Each drive wheel 1 is attached to the output shaft 19 of the corresponding gear reduction unit 16, and an input shaft of each of the gear reduction units 16 not shown in the drawings is connected to an electric motor 15. Thus, by actuating each of the electric motors 15 in either direction, the corresponding drive wheel 1 can be rotatively driven in the corresponding direction via the gear reduction unit 16 and the output shaft 19.

A battery 14 is mounted on top of each of the gear reduction units 16, and is electrically connected to the corresponding electric motor 15. At the same time, the weight of each of the batteries 14 is applied onto the corresponding drive wheel 1.

A curved pipe member 10*c* is attached to a lower part of the front frame 10A, and a connecting part 20 extending across the middle parts of this pipe member 10*c* and the support pipe 10*a* is fitted into a vertically oriented seat mounting pipe 21. The connecting part 20 and the seat mounting pipe 21 can be integrally attached to each other by using a connecting pin not shown in the drawing.

One of the armrests 6 is fitted with the console unit 12, and the motors 15 an be controlled by operating the joystick 13 of the console unit 12.

In this embodiment, a tension spring 22 extends between the body frame 10 and the link member 11 so that the drive wheels 1 are firmly pressed onto the floor surface by the tension spring 22 urging the link member 11 in counter clockwise direction around the connecting point as shown in FIG. 5. Thereby, the frictional engagement between the drive wheels 1 and the floor surface is enhanced, and the traction for forward and rearward movement is increased.

More specifically, a bracket 11*c* is attached to a middle part of the horizontal section of the pipe member 11*a* of the link member 11, and the pair of tension springs 22 extend from either side of this bracket 11*c* to the corresponding sides of a bracket 21*a* attached to the seat mounting pipe 21.

According to this arrangement, the drive wheels 1 can be firmly urged upon the floor surface by increasing the spring force of the tension springs 22, but the front caster wheels 2 could be excessively lifted particularly when the wheelchair is not occupied, thereby causing some difficulty to a person who wishes to ride the wheelchair.

To prevent this from occurring, separate spring means is provided between the body frame 10 and the link member 11. This spring means 23 permits the tension springs 22 to urge the drive wheels 1 onto the floor surface while preventing the front caster wheels 2 from being excessively lifted from the floor surface.

Figure 7:
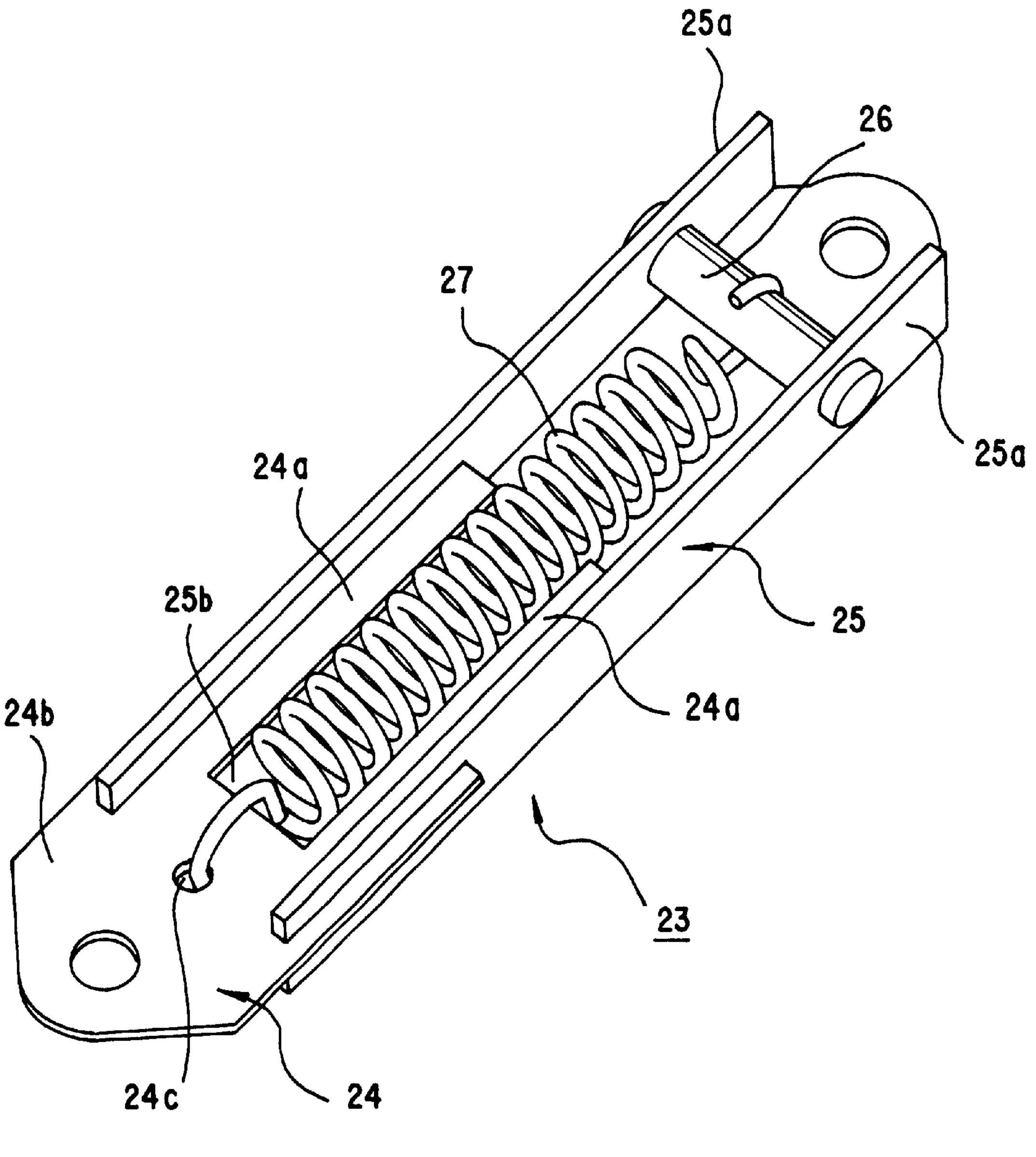
FIG. 7 is a perspective view of the spring means.
Figure 8:
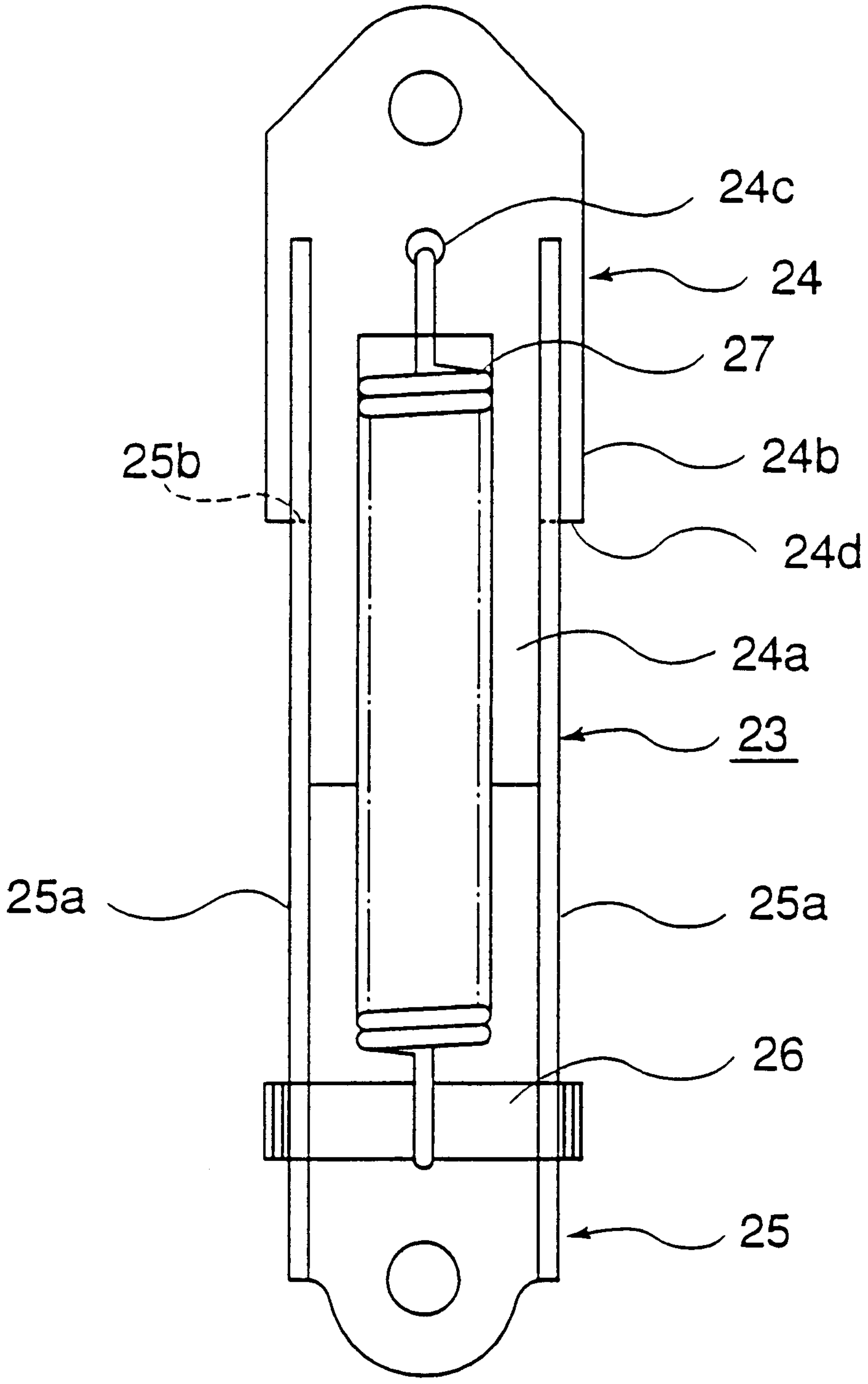
FIG. 8 is a front view of the spring means.
Figure 9:
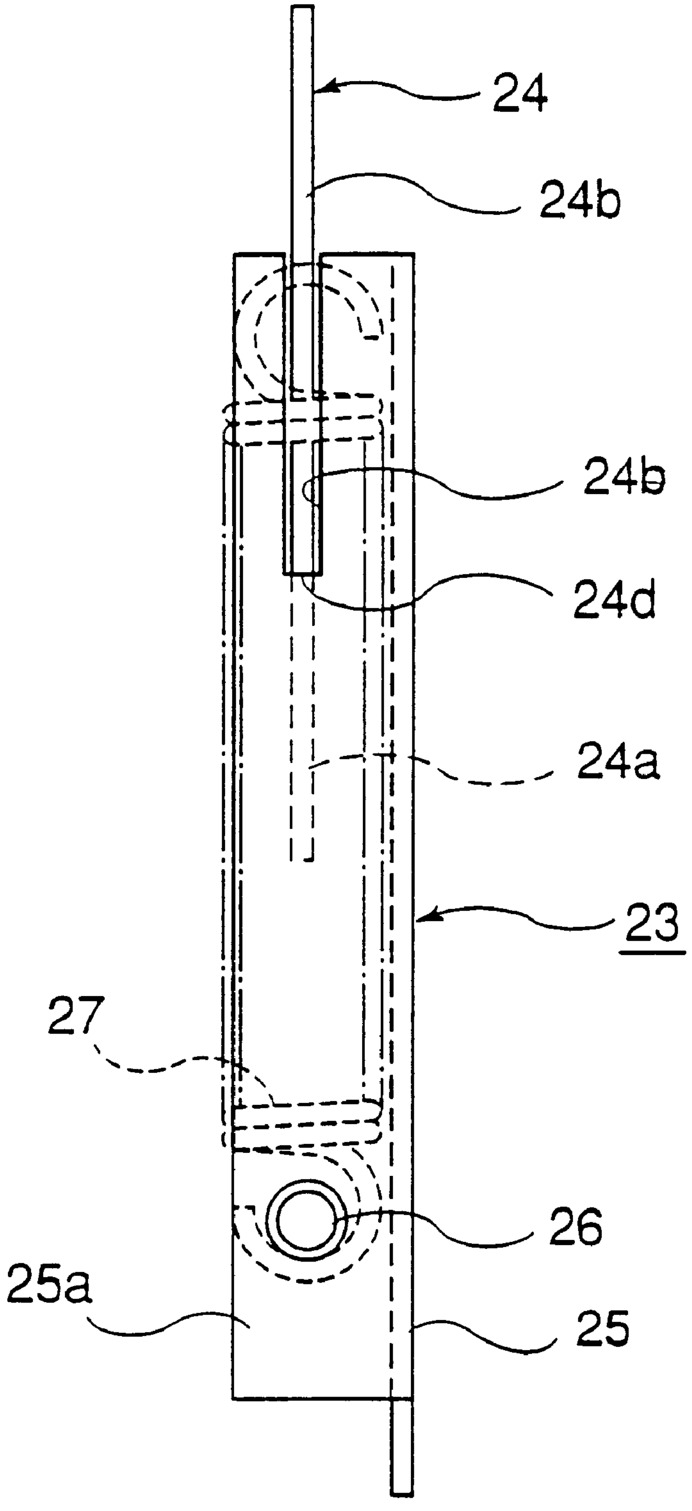
FIG. 9 is a side view of the spring means.

As illustrated in the perspective view of FIG. 7, the front view of FIG. 8 and the side view of FIG. 9, the spring means 23 comprises a first bracket 24 connected to the body frame 10, and a second bracket 25 connected to the link member 11. The second bracket 25 on the side of the link member 11 is provided with a pair of bent portions 25*a* formed along either side of a plate member, and a slit 25*b* extends from an intermediate part of each bent portion 25*a* toward a distal end (upper end as seen in FIGS. 8 and 9) of the second bracket 25.

The first bracket 24 is formed by a flat plate member, and a distal end (lower end as seen in FIGS. 8 and 9) thereof consists of a narrowed portion 24*a* having a same width as the spacing between the bent portions 25*a* of the second bracket 25. A proximal end thereof consists of a broadened portion 24*b* having a larger width than the narrowed portion 24*a*. The narrowed portion 24*a* is placed between the bent portions 24*b* in a freely slidable manner, and the broadened portion 24*b* is slidably engaged in the slits 25*b* of the second bracket 25.

A pin 26 is secured across the bent portions 25*a* of the second bracket 25, and a hole 24*c* is formed in the first bracket 24. A tension spring 27 is engaged between the pin 26 and the hole 24*c* in such a manner that the first and second brackets 24 and 25 are urged toward each other, and a shoulder 24*d* defined between the narrowed portion 24*a* and the broadened portion 24*b* normally abuts end portions of the slits 25*b*.

As shown in FIG. 5, the second bracket 25 is pivotally attached to the link member 11 via the pin 28 while a pin 29 secured to the first bracket 24 is engaged by a slot 30 formed in the middle frame 10B so that the first bracket 24 is allowed to move in the fore-and-aft direction of the wheelchair and to pivot with respect to the middle frame 10B.

The spring force of the tension spring 27 of the spring means 23 is selected to be greater than that of the tension spring 22 so that the tension spring 27 urges the link member 11 in clockwise direction against the action of the tension spring 22 which urges the link member 11 in counterclockwise direction as seen in FIG. 5 around the connecting point P.

In the spring means 23, when the tension spring 27 shrinks, the pin 28 provided in the second bracket 25 abuts the forward end surface of the slot 30 (the position indicated in FIG. 5) so that if the link member 11 is turned in clockwise direction in this state, the abutting of the shoulder 24*d* defined between the narrowed portion 24*a* and the broadened portion 24*b* onto an end surface of the slits 25*b* stops the clockwise rotation of the link member 11. At this point, the rear caster wheels 3 and the drive wheels 1 are in contact with the floor surface while the front caster wheels 2 are slightly raised from the floor surface.

Figure 10:
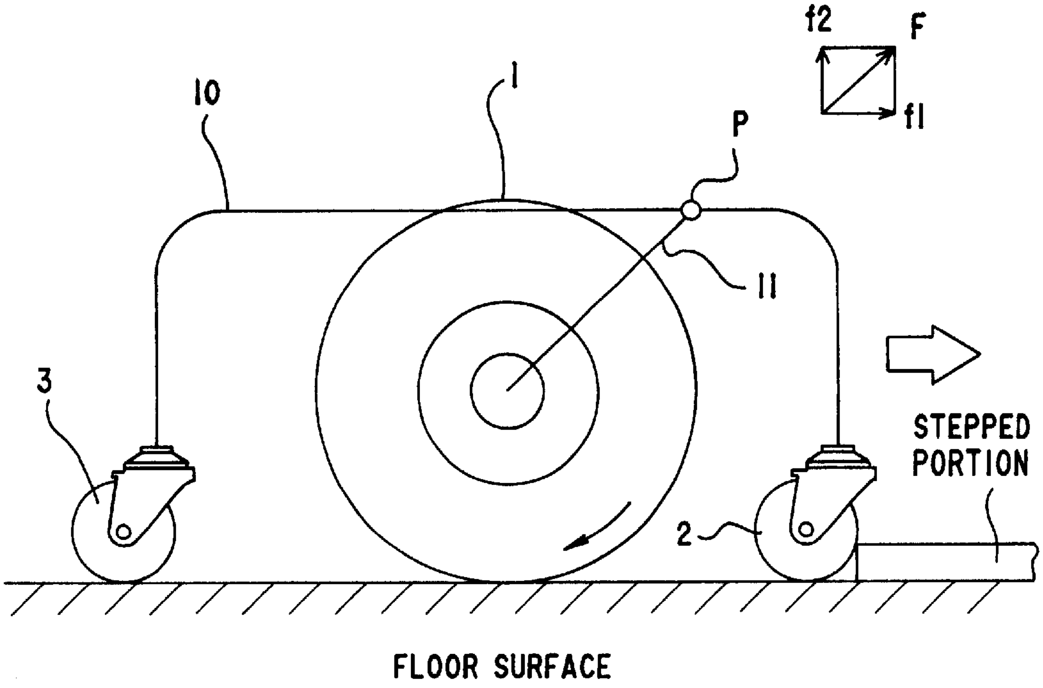
FIG. 10 is an illustrative view showing the operation of the electric motor-powered wheelchair of FIG. 1 as it advances over a stepped part of the floor.
Figure 11:
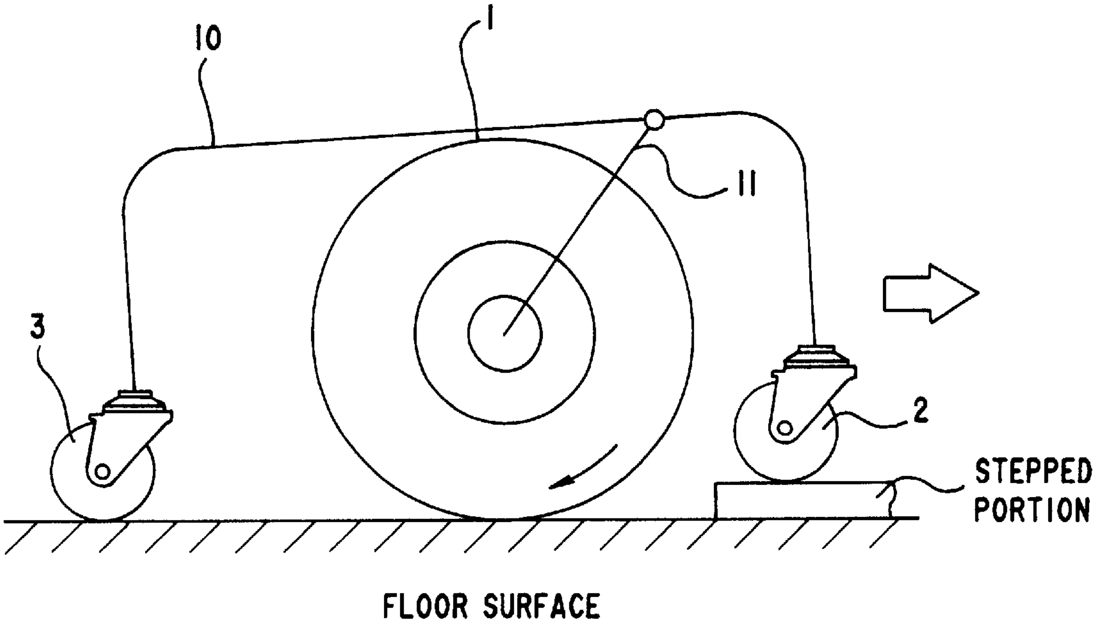
FIG. 11 is an illustrative view showing the operation of the electric motor-powered wheelchair of FIG. 1 as it moves backward over a stepped part of the floor.

This wheelchair having the above described structure is capable of riding over a stepped portion of a floor surface as described in the following with reference to FIGS. 10 and 11. When the drive wheels 1 are rotatively driven in the forward direction (rightward as seen in FIG. 1), a force F directed obliquely upward along the length of the link member 11 acts upon the link member 11, and the forward component $f_1$ of this force acting on the link member 11 propels the body frame (wheel chair) 10 in the forward direction.

When the drive wheels 1 are rotatively driven in the rearward direction, the link member 11 is pulled obliquely downward, and the rearward component of this pulling force propels the body frame 10 in the rearward direction.

Suppose that the front caster wheels 2 are pushed onto an obstacle having a height equal to one half the diameter of the front caster wheels 2, the forward movement of the front caster wheels 2 is prevented. If the drive wheels 1 are driven forward even further with the front caster wheels 2 thus obstructed, the upward component $f_2$ of the obliquely upward force F applied to the link member 11, as a result of the drive torque applied to the drive wheels 1, causes the body frame 10 to turn in counter-clockwise direction around the rear caster wheels 3 as seen in FIG. 10.

As a result, the front caster wheels 2 ride over the stepped portion of the floor surface along the end surface thereof by virtue of the upward component $f_2$ of the force from the drive wheels 1 while being pressed onto the end surface by the forward component $f_1$ of the force from the drive wheels 1. The front caster wheels 2 can thus ride over the stepped portion of the floor surface as illustrated in FIG. 11.

Figure 12:
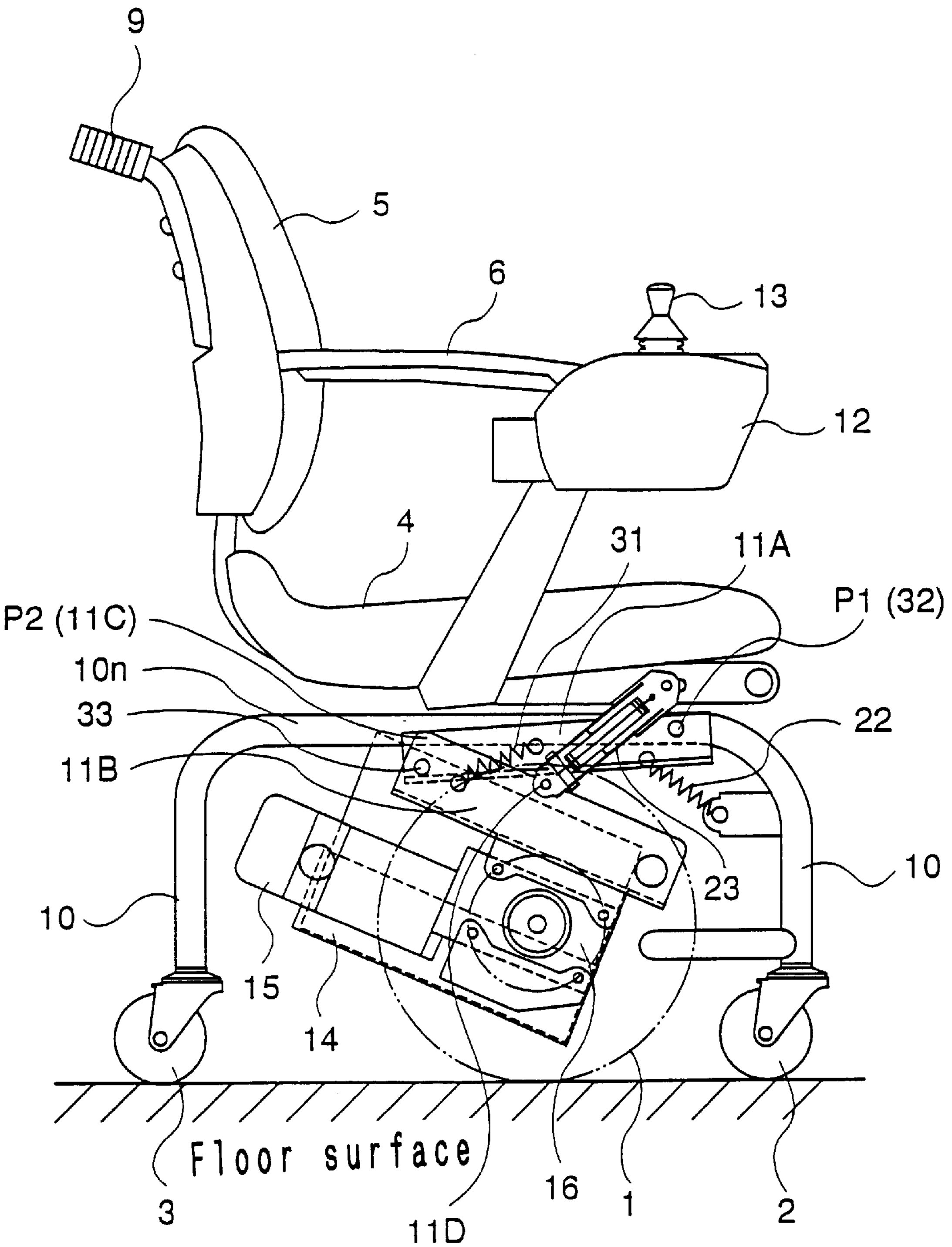
FIG. 12 is a side view of a second embodiment of the electric motor-powered wheelchair according to the present invention.
Figure 13:
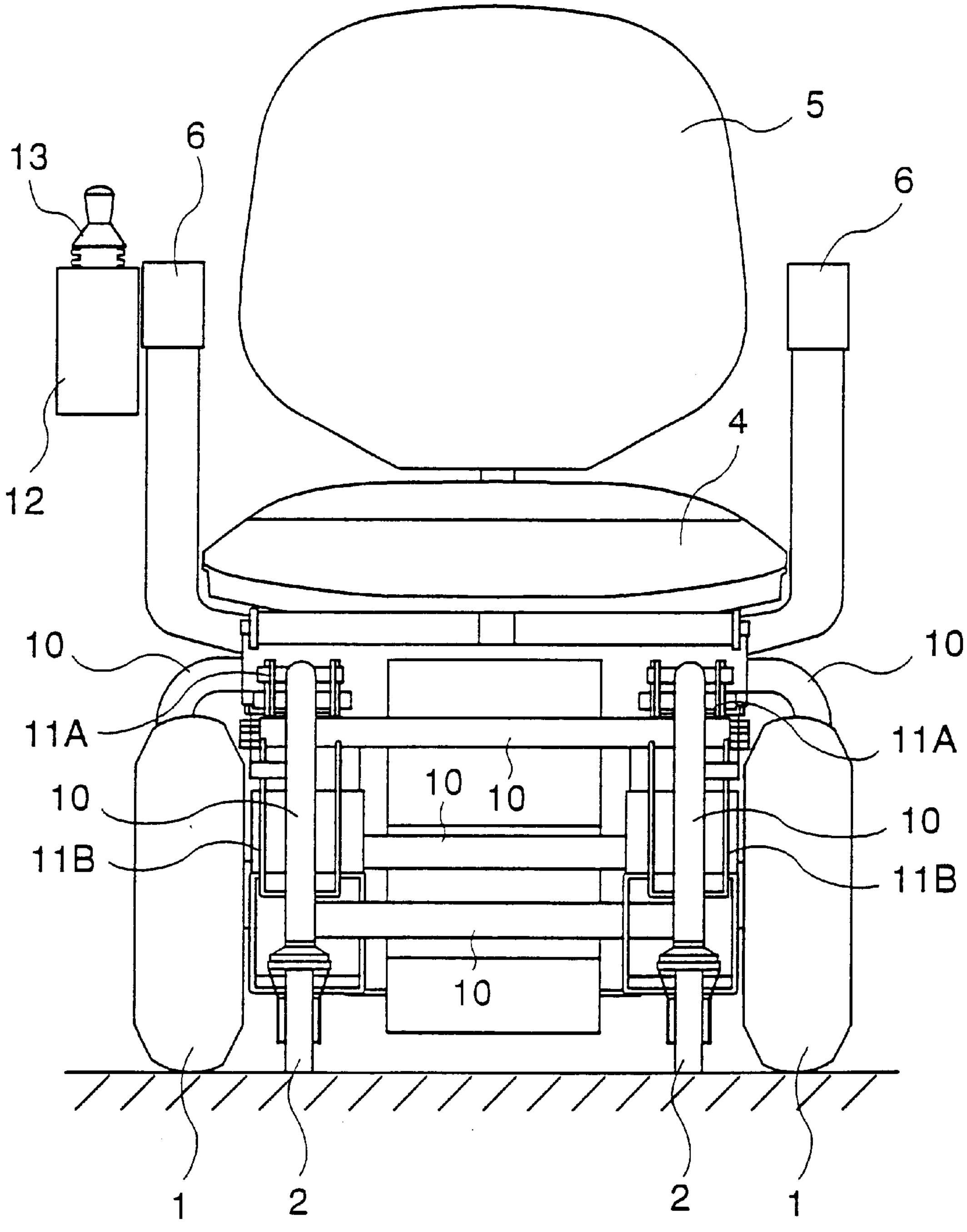
FIG. 13 is a front view of the electric motor-powered wheelchair of FIG. 12.
Figure 14:
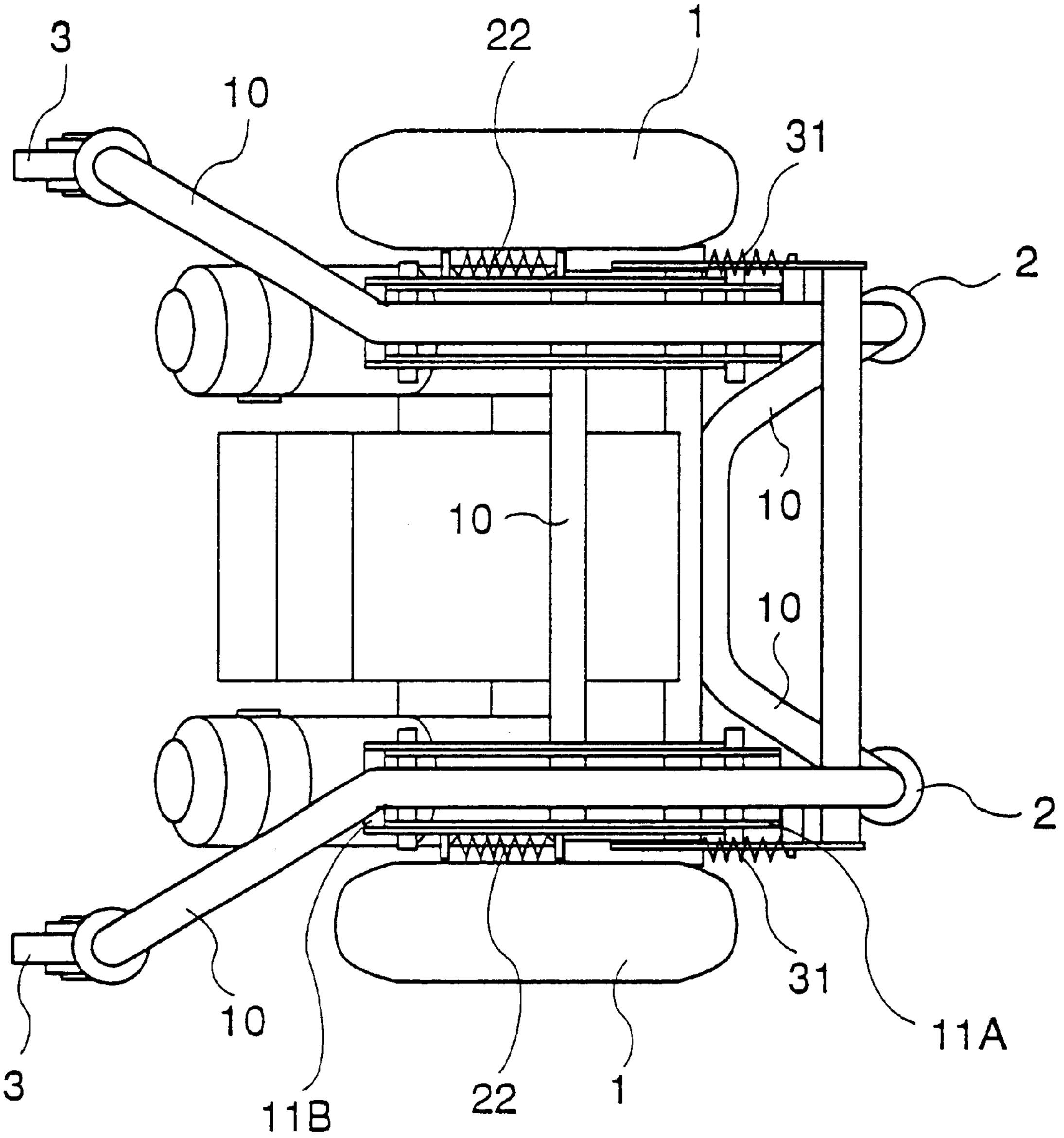
FIG. 14 is a top view of the electric motor-powered wheelchair of FIG. 12 with its seat removed.

A wheelchair constructed as a second embodiment of the present invention and adapted to be capable of riding over a stepped portion of a floor surface even when the wheelchair is moving backward by the same principle as when moving forward is described in the following with reference to the side view of FIG. 12, the front view of FIG. 13 and the plan view of FIG. 14, the seat being omitted from illustration in FIG. 14.

In this electric motor-powered wheelchair, a pair of drive wheels 1 are attached to a body frame 10 via a link member 15, and a pair of front caster wheels 2 and a pair of rear caster wheels 3 are attached to the body frame 10 to the front and rear of the drive wheels 1, respectively, so that the undercarriage of this wheelchair is adapted to be turned around an approximately middle point of a line connecting the rotational centers of the drive wheels while the wheelchair remains at a stationary point. So far, this wheelchair is not different from the wheelchair of the first embodiment.

The wheelchair of this embodiment differs from the wheelchair of the first embodiment only in that the link member of this embodiment is adapted to rider over a stepped portion of a floor surface also when the wheelchair is moving backward whereas the link member 11 of the first embodiment was adapted for riding over a stepped portion of a floor surface only when the wheelchair is moving forward.

More specifically, the link member of this embodiment consists of a combination of a first link member 11A and a second link member 11B. The first link member 11A is pivotally attached to an upper point $P_1$ of the body frame 10 at one end thereof via a pin 32, and the second link member 11B is pivotally attached to the other end of the first link member 11A at one end thereof via a pin 33, the one end of the second link member 11B coinciding with a pivotal point $P_2$ for riding over a stepped portion of a floor surface when the wheelchair is moving backward. This articulated arrangement is intended to allow the wheelchair to ride over a stepped portion of a floor surface.

The rotary shaft of the drive wheel 1 is located behind the point of connection between the body frame 10 and the first link member 11A at least before the front caster wheels 2 abut the stepped portion of the floor surface, and is located ahead of the point of connection (pin 33) between the body frame 10 and the second link member 11B at least before the rear caster wheels 3 abut the stepped portion of the floor surface.

Furthermore, the first and second link members 11A and 11B are switched over in such a manner that the first link member 11A is selected when the wheelchair rides over a stepped portion of a floor surface while moving forward, and the second link member 11B is selected when the wheelchair rides over a stepped portion of a floor surface while moving backward.

To achieve such a selective switching action, according to this embodiment, a first stopper 11C is used so that when the wheelchair rides over a stepped portion of a floor surface while moving rearward, the first link member 11A is fixedly secured to the body frame 10, and the drive wheel 1 is rotatably supported at the other end of the second link member 11B. The first stopper 11C is located on the lower surface of an upper pipe portion 10*n* of the body frame 10 at the height of point P2 which is the top dead center of the pin 33 connecting the first link member 11A and the second link member 11B.

When the wheelchair rides over a stepped portion of a floor surface while moving forward, a second stopper 11D is used which fixedly secures the first and second link members 11A and 11B to each other, and rotatably supports the drive wheels at the other end of the first link member 11A. The first and second link members 11A and 11B are provided with notches for receiving the second stopper 11D.

The switch-over between the first and second link members 11A and 11B takes place whenever the front or rear caster wheels 2 or 3 run into a stepped portion of a floor surface as the wheelchair moves forward or rearward as described hereinafter. Numeral 31 denotes a spring for restoring the second link member.

In this embodiment also, a tension spring 22 is placed between the body frame 10 and the link member (the combination of the first and second link members 11A and 11B), and by virtue of this tension spring 22, the first link member 11A is angularly urged in counter-clockwise direction around the point $P_1$ of connection between the body frame 10 and the first link member 11A so as to firmly press the drive wheels 1 onto the floor surface. Thus, similarly as the first embodiment, the frictional force between the drive wheels 1 and the floor surface is increased so as to maximize the traction in both the forward and rearward directions.

To prevent the front caster wheels 2 from being excessively lifted and thereby causing some difficulty for riding the wheelchair, separate spring means 23 is provided between the body frame 10 and the link member. This spring means 23 prevents the front caster wheels 2 from being excessively lifted while allowing the drive wheels 1 to be firmly pressed onto the floor surface by the tension spring 22. When the wheelchair has ridden over a stepped portion of a floor surface while moving rearward with the first link member 11A fixed relatively to the body frame 10 by the first stopper 11C, and the second link member 11B remaining operative, the second link member 11B could open out by more than 90 degrees relatively to the first link member 11A. This can be avoided by restoring the second link member 11B to the original position indicated in FIG. 11 with the retractive force of the restoring spring 31 for the second link member 31 after moving over a stepped portion of a floor surface.

Figure 15B:
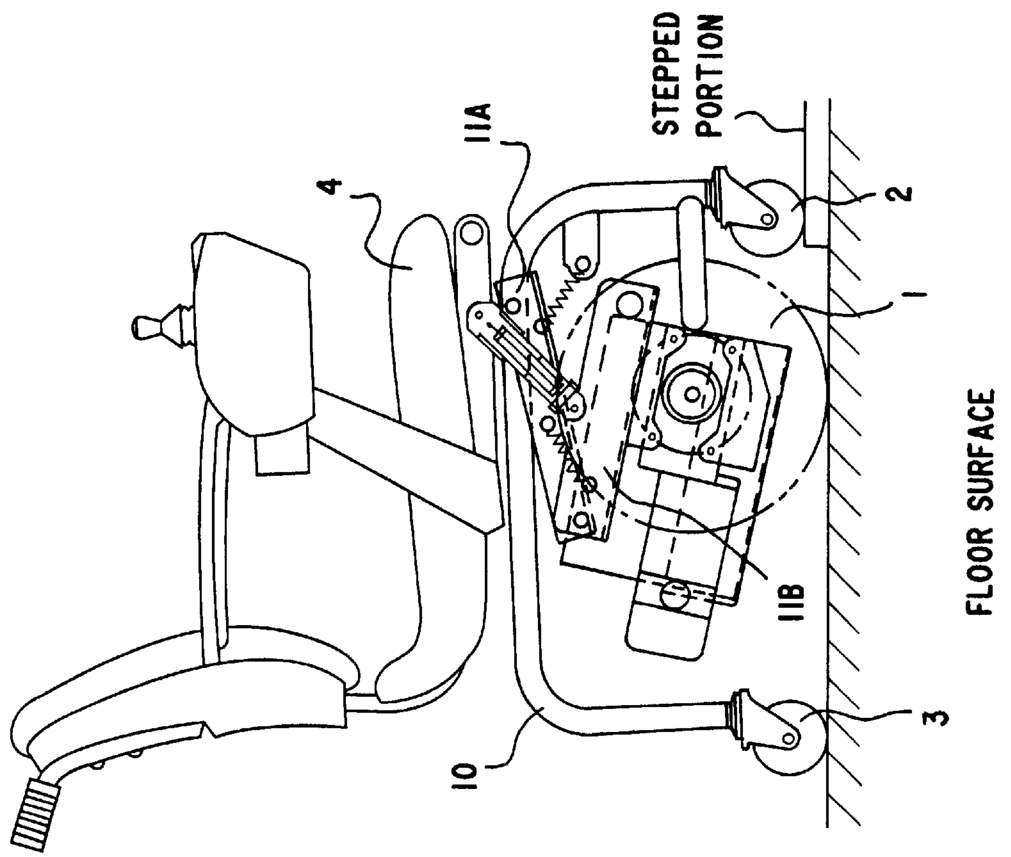
FIG. 15 is a view showing the electric motor-powered wheelchair of FIG. 12 as it advances over a stepped part of the floor.
Figure 15A:
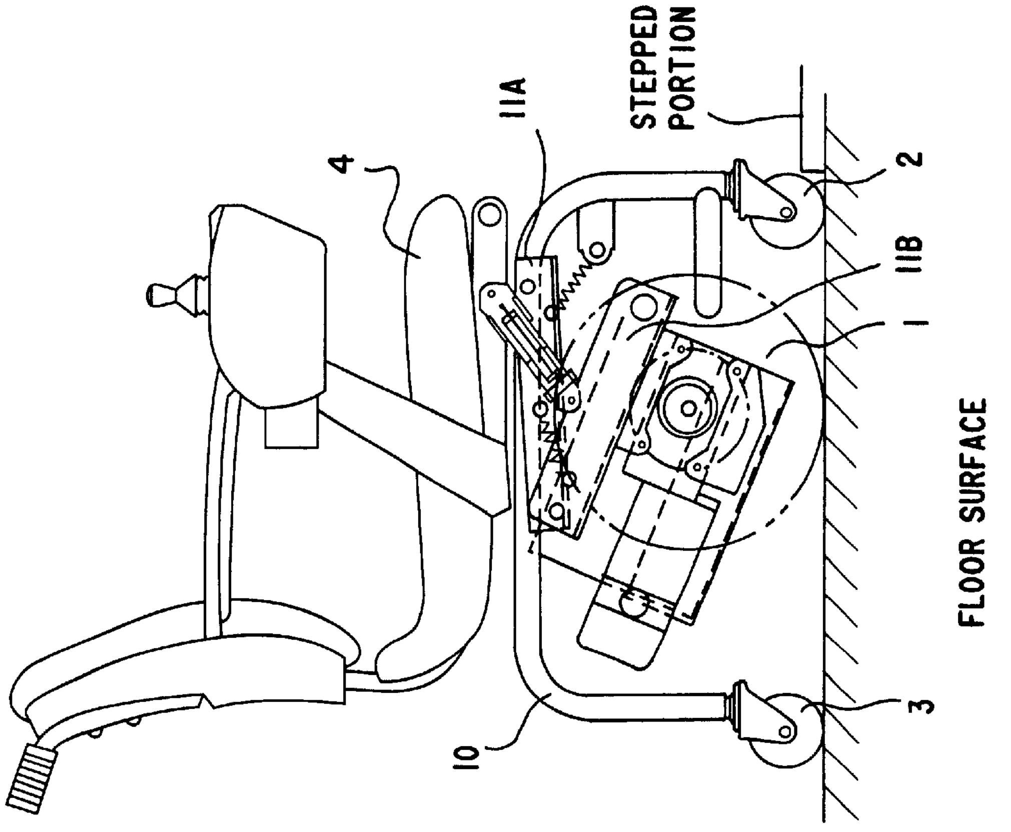
Figure 16B:
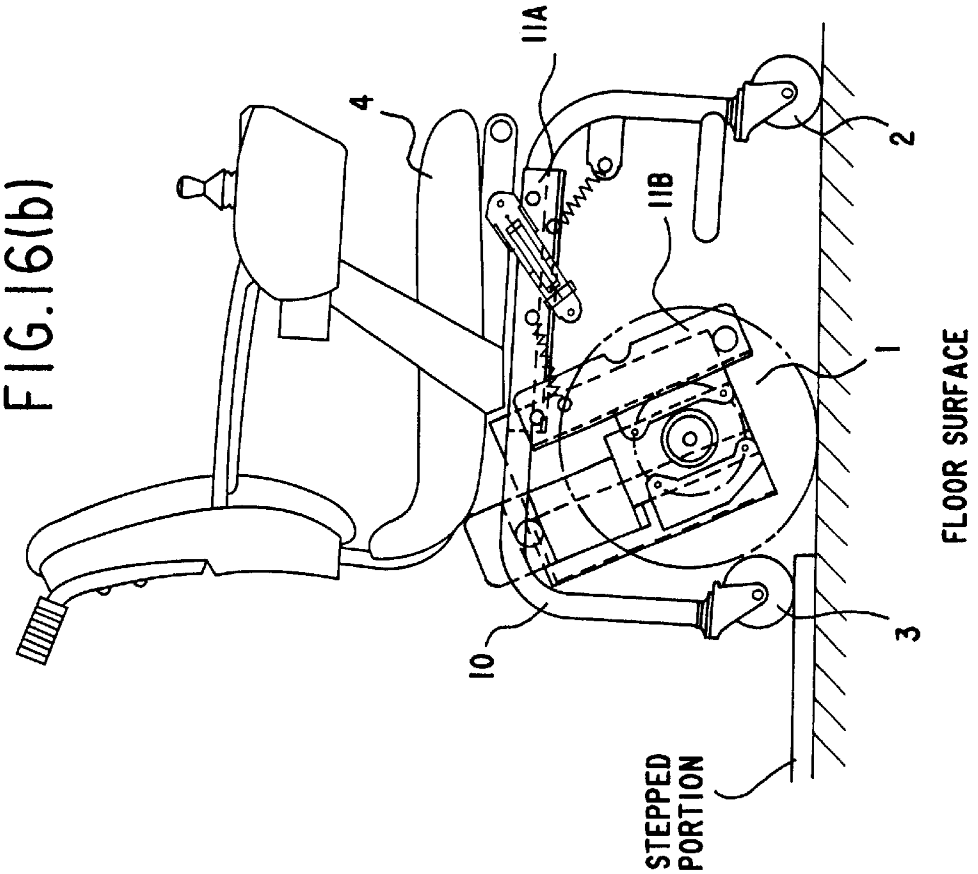
FIG. 16 is a view showing the electric motor-powered wheelchair of FIG. 12 as it moves backward over a stepped part of the floor.
Figure 16A:
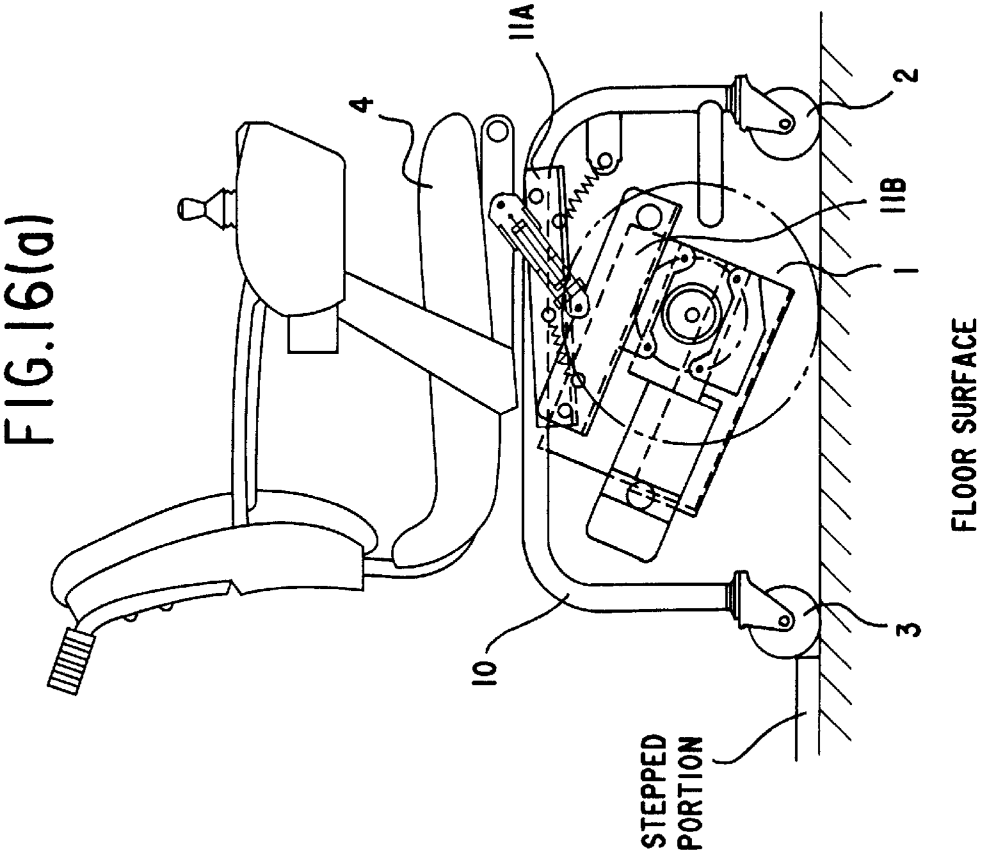

Because the electric motor-powered wheelchair of the second embodiment is constructed as described above, when the front caster wheels 2 run into a stepped portion of a floor surface while moving forward as shown in FIG. 15(*a*), they can safely ride over the stepped portion as illustrated in FIG. 15(*b*). When the front caster wheels 2 run into a stepped portion of a floor surface while moving rearward as shown in FIG. 16(*a*), they can safely ride over the stepped portion as illustrated in FIG. 16(*b*). Now the action of riding over a stepped portion is described in the following.

Figure 17A:
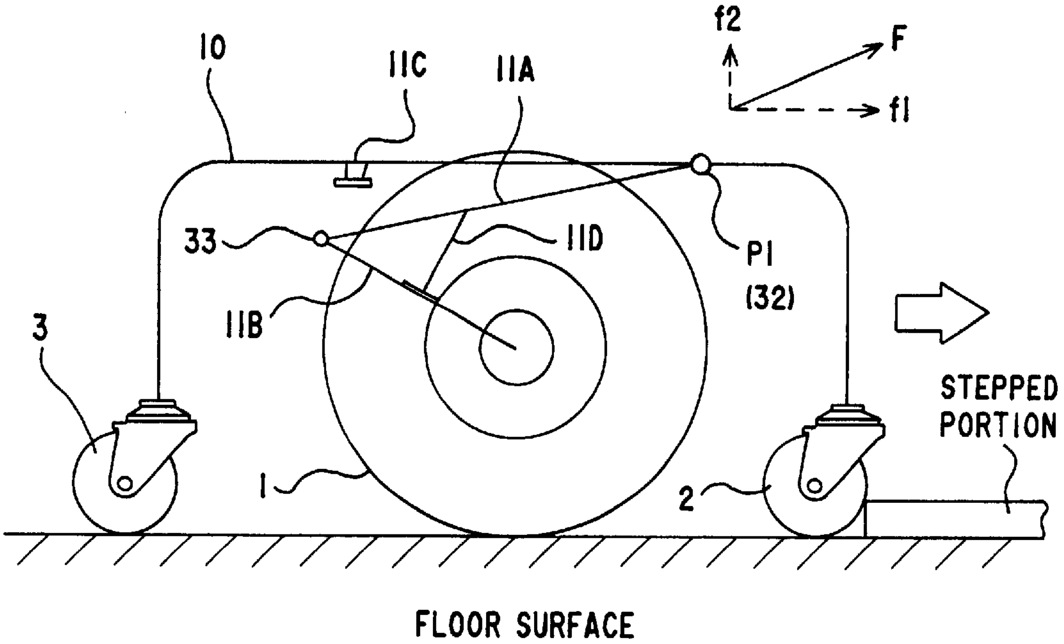
FIG. 17 is an illustrative view showing the operation of the electric motor-powered wheelchair of FIG. 12 as it advances over a stepped part of the floor.
Figure 17B:
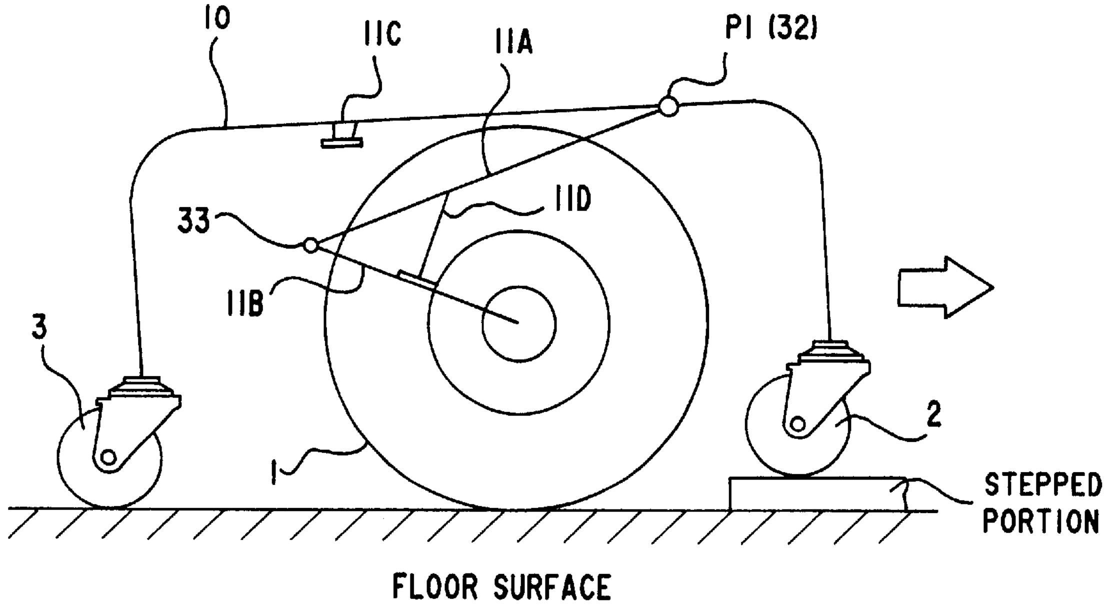

When the front caster wheels 2 run into a step having a height which is one half the diameter of the caster wheels, and the drive wheels 1 are further driven in the forward direction while the wheelchair is moving forward as illustrated in FIG. 17(*a*), the second stopper 11D fixedly secures the first and second link members 11A and 11B relatively to each other, and rotatably supports the drive wheels 1 at the other end of the first link member 11A. As a result, the first link member 11A is subjected to a force F which is directed obliquely upward along the length of the first link member 11A. At the same time, because the upward component $f_2$ of the obliquely upward force F is applied to the body frame 10, the wheelchair is subjected to a rotatively force which tends to tilt up the front end of the wheelchair around the rear caster wheels 3. When the front caster wheels 2 are lifted by more than the height of the step, the front caster wheels 2 land on the upper surface of the step as illustrated in FIG. 17(*b*), thus enabling the wheelchair to ride over the step while moving forward.

Figure 18A:
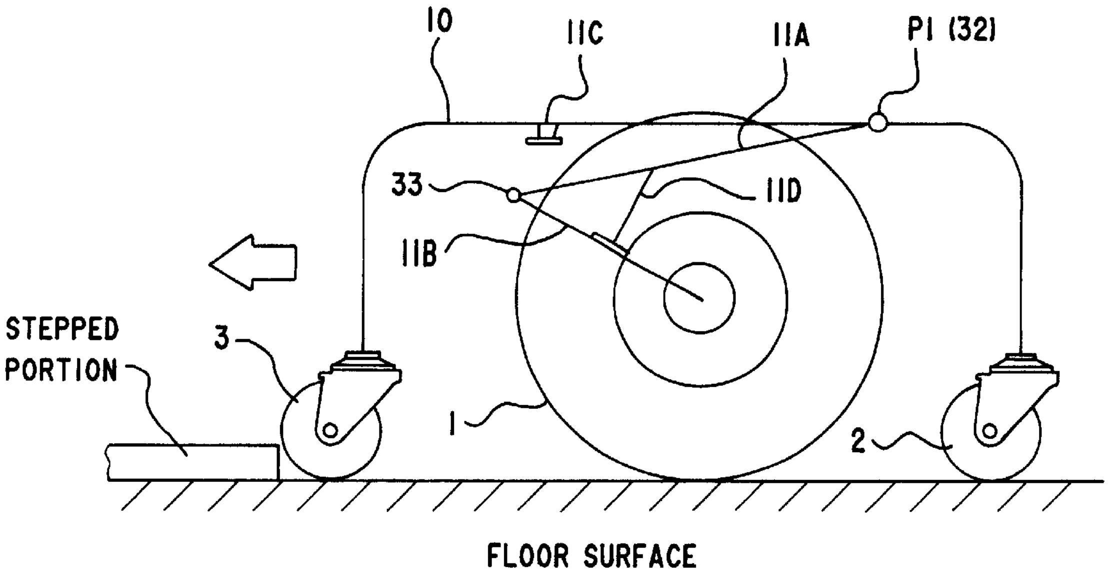
FIG. 18 is an illustrative view showing the operation of the electric motor-powered wheelchair of FIG. 12 as it moves backward over a stepped part of the floor.
Figure 18B:
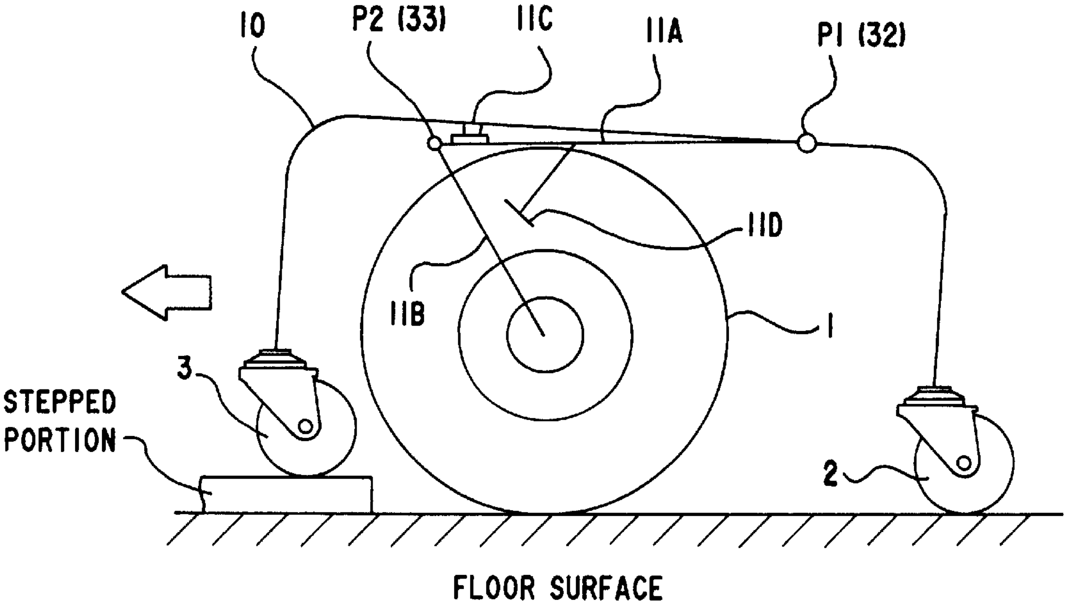

When the rear caster wheels 3 run into a step having a height which is one half the diameter of the caster wheels, and the drive wheels 1 are further driven in the rearward direction while the wheelchair is moving rearward as illustrated in FIG. 18(*a*), the first stopper 11C fixedly secures the first link member 11A relatively to the body frame 10, and rotatably supports the drive wheels 1 at the other end of the second link member 11A. As a result, the second link member 11B is subjected to a force F which is directed obliquely upward along the length of the second link member 11B. At the same time, because the upward component of the obliquely upward force is applied to the body frame 10, the wheelchair is subjected to a rotatively force which tends to tilt up the rear end of the wheelchair around the front caster wheels 2. When the rear caster wheels 2 are lifted by more than the height of the step, the rear caster wheels 3 land on the upper surface of the step as illustrated in FIG. 18(*b*), thus enabling the wheelchair to ride over the step while moving rearward.

Thus, the various embodiments of the electric motor-powered wheelchair of the present invention are suited for lightly handicapped individuals such as senior citizens who are capable of walking short distances but have some difficulty in walking to remote destinations, and the wheelchair of the present invention can easily travel over steps that may be present on the way.

The disclosed embodiments consisted of electric motor-powered wheelchairs, but it is obvious that the present invention is equally applicable to hand propelled wheelchairs. Two pairs of caster wheels were arranged in the front and rear of a pair of drive wheels in the above described embodiments, but single caster wheels may be placed in the front and rear of the drive wheels. Alternatively, three caster wheels may be placed to each of the front and rear of the drive wheels, or the wheelchair may include a pair of front caster wheels, and three rear caster wheels among other design possibilities.

INDUSTRIAL UTILITY

As can be appreciated from the above description, the present invention provides a wheelchair having small wheels for optimum maneuverability which can easily ride over steps without causing discomfort to the user.

What we claim is:

1. A wheelchair comprising a pair of drive wheels mounted to a body frame and a front caster wheel and a rear caster wheel mounted to the body frame in a position to the front and rear of the drive wheels so as to allow the wheelchair to turn at a stationary position, comprising:

a link member extending between the body frame and the drive wheels, and having one end pivotally connected to an upper part of the body frame and another end rotatably supporting the drive wheels so that the drive wheels are movable back and forth freely with no restriction to the rear caster wheel; and the link member being assembled in such a manner that the link member turns around a point of connection between the link member and the body frame in a direction to reduce a distance between the front caster wheel and the drive wheels when the front caster wheel abuts a stepped portion of a floor surface, and turns around the point of connection to an original position and to restore the distance between the front caster wheel and the drive wheels once the abutting relationship between the front caster wheel and the stepped portion is resolved.

2. A wheelchair comprising a pair of drive wheels mounted to a body frame and a front caster wheel and a rear caster wheel mounted to the body frame in a position to the front and rear of the drive wheels so as to allow the wheelchair to turn at a stationary position, comprising:

a link member extending between the body frame and the drive wheels, and having one end pivotally connected to an upper part of the body frame and another end rotatably supporting the drive wheels;

the link member being assembled in such a manner that the link member turns around a point of connection between the link member and the body frame in a direction to reduce a distance between the front caster wheel and the drive wheels when the front caster wheel abuts a stepped portion of a floor surface and turns around the point of connection to an original position and to restore the distance between the front caster wheel and the drive wheels once the abutting relationship between the front caster wheel and the stepped portion is resolved;

first spring means and second spring means disposed between the link member and the body frame, the first spring means applying a downward urging force to the link member, and the second spring means applying an upward urging force to the link member;

the second spring means comprising a first bracket attached to the body frame so as to be moveable in a fore-and-aft direction, a second bracket attached to the link member, and a tension spring engaged between the two brackets, the tension spring having a stronger spring force than the first spring means, and normally maintaining the first bracket and the second bracket in a mutually abutting relationship;

a length of the second spring means when the first bracket and the second bracket are placed in a mutually abutting relationship being selected so as to coincide with a length thereof when the second bracket is located at a frontmost position with respect to the body frame, and the second spring means prevents the downward movement of the link member against the spring force of the first spring means with the drive wheels kept in contact with the floor surface.

3. A wheelchair comprising a pair of drive wheels mounted to a body frame and a front caster wheel and a rear caster wheel mounted to the body frame in a position to the front and rear of the drive wheels so as to allow the wheelchair to turn at a stationary position, further comprising:

a first link member extending between the body frame and the drive wheels, and having one end pivotally connected to an upper part of the body frame at a front part thereof with respect to a first traveling direction and another end rotatably supporting the drive wheels, and a second link member extending between the body frame and the drive wheels, and having one end pivotally connected to an upper part of the body frame at a front part thereof with respect to a second traveling direction and another end rotatably supporting the drive wheels;

one of the first and second link members being selected when the wheelchair is moving forward, and the other of the first and second link members being selected when the wheelchair is moving rearward;

the first and second link members being assembled in such a manner that a selected one of the first and second link members turns around a point of connection between the one of the first and second link members and the body frame, when the corresponding caster wheel abuts a stepped portion of a floor surface, in a direction to reduce a distance between the drive wheels and the abutting caster wheel, and turns around the point of connection to an original position and to restore the distance between the abutting caster wheel and the drive wheels once the abutting relationship between the corresponding caster wheel and the stepped portion is resolved.

4. A wheelchair according to claim 3, wherein:

the first link member is pivotally attached to an upper part of the body frame at one end thereof, and the second link member is pivotally attached to another end of the first link member at one end thereof at an upper part of the body frame;

the wheelchair further comprising:

a first stopper for fixing the first link member relative to the body frame, and rotatably supporting the drive wheels at another end of the second link member when the wheelchair rides over a stepped portion of a floor surface as the wheelchair moves rearward; and a second stopper for fixing the first and second link members relative to each other, and rotatably supporting the drive wheels at another end of the first link member when the wheelchair rides over a stepped portion of a floor surface as the wheelchair moves forward.

* * * * *